July 17, 1934.  D. H. GOODWILLIE  1,967,025
SHEET GLASS FORMING APPARATUS
Filed March 13, 1933   2 Sheets-Sheet 1
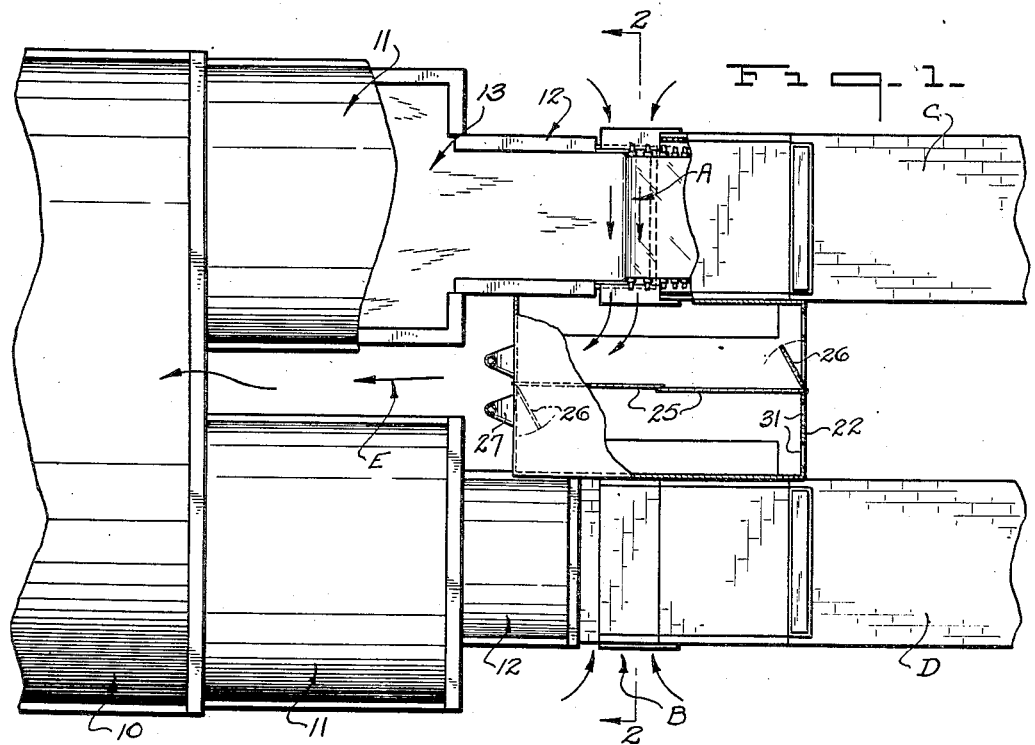
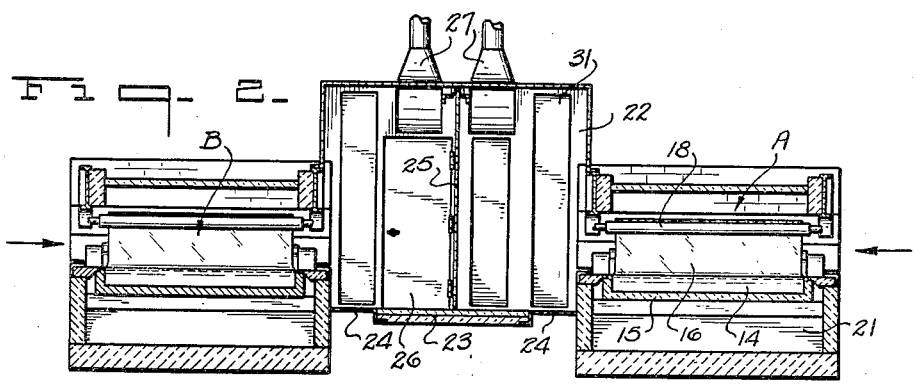
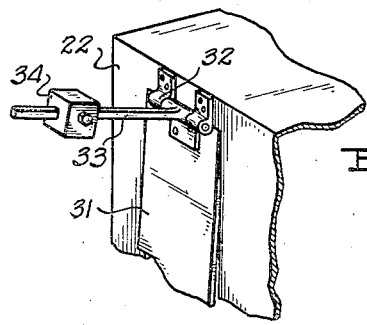
Inventor
DAVID H. GOODWILLIE.
By Frank Fraser
Attorney July 17, 1934.   D. H. GOODWILLIE   1,967,025
SHEET GLASS FORMING APPARATUS
Filed March 13, 1933   2 Sheets-Sheet 2
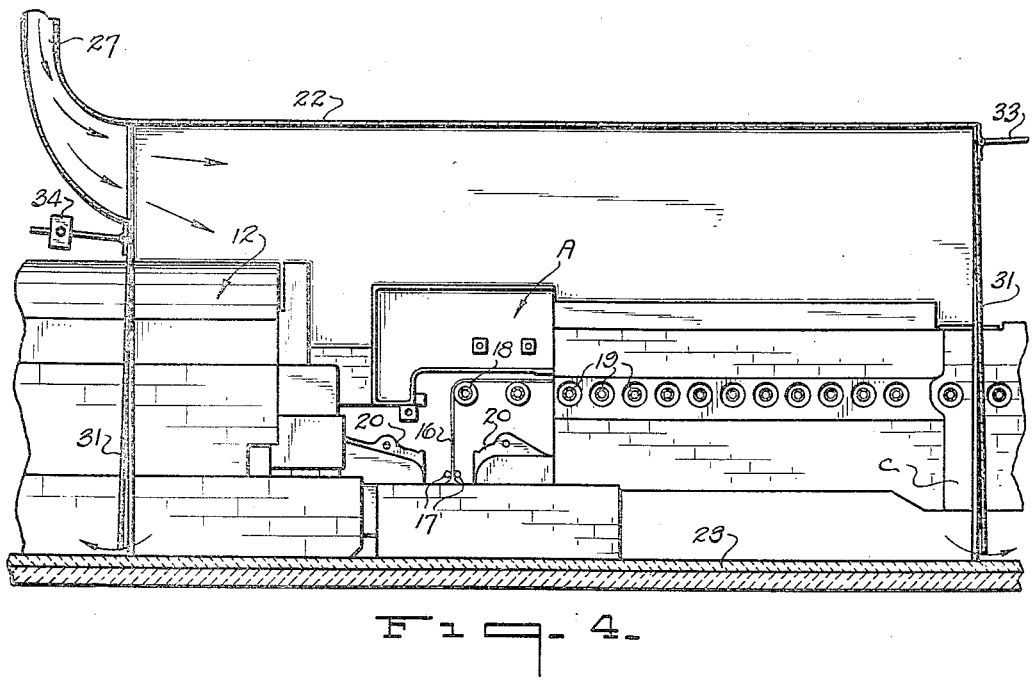
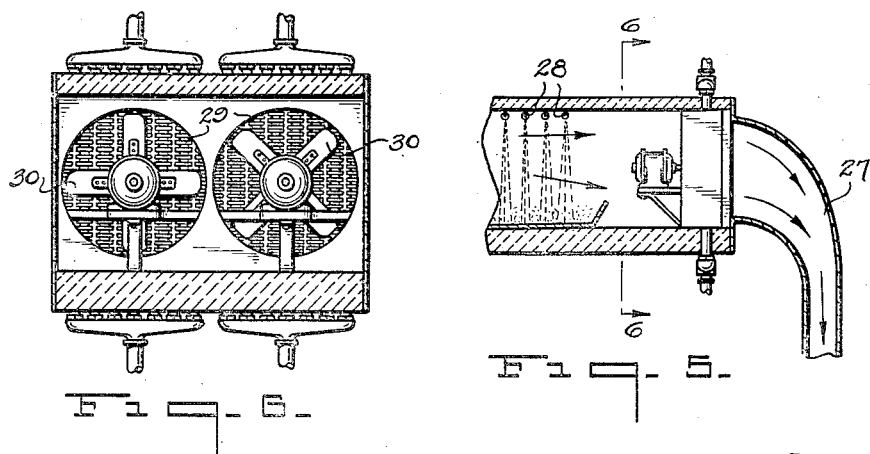
Inventor
DAVID H. GOODWILLIE.
By Frank Fraser
Attorney Patented July 17, 1934

1,967,025

UNITED STATES PATENT OFFICE 1,967,025

SHEET GLASS FORMING APPARATUS

David H. Goodwillie, Toledo, Ohio, assignor to Libbey-Owens-Ford Glass Company, Toledo, Ohio, a corporation of Ohio Application March 13, 1933, Serial No. 660,475

13 Claims. (Cl. 49—17)

The present invention relates to sheet glass forming apparatus.

More particularly, the invention has to do with the continuous formation of molten glass into flat sheet form. There are a number of different processes and machines by which molten glass can be reduced to sheet form, among which is the well known Colburn system wherein molten glass is continuously drawn from the surface of an open bath of molten glass.

Primarily, the invention is particularly adapted for use in connection with a tank furnace designed to supply molten glass to two or more machines which extend in the same general direction from the furnace. While the drawings show the invention as applied to such a double tank, nevertheless it will be understood that the same idea can be used in conjunction with two or more machines whether the machines be supplied from the same tank furnace or from independent furnaces.

In the commercial exploitation of the type of sheet glass machine disclosed in the U. S. Patent No. 1,248,809 to Colburn, dated December 4, 1917, some machines have been supplied with glass from individual tank furnaces and in other cases two of such machines have been applied with glass from a common melting furnace.

Very good results have been obtained with the so-called double tank furnaces when all of the glass is melted in a common chamber and passed through separate and independent refining and cooling channels, with each refining and cooling channel supplying molten glass to a single working receptacle only.

While the refining and cooling chambers and working reecptacles have constituted in a sense independent and separately controlled units, although fed from a common melting tank, due to the fact that both of the channels have extended from one end of the melting tank, with the result that the forming machines are in fairly close proximity to one another, I have determined that certain defects and undesirable conditions are brought about.

The technique of melting glass in a single tank and supplying properly refined molten glass to a number of independent working receptacles has been worked out to a high degree of efficiency. However, when using the Colburn type of machine, for example, the glass in the working receptacle and the sheet itself is more or less exposed, and I have found that, due to improper and undesirable circulation of air and other gases across the working receptacle and in contact with the sheet, an excessive amount of dirt finds its way onto and into the sheet. Also, such drafts or currents of air tend to produce a so-called sheen on the surfaces of the glass and, furthermore, oftentimes cause a slight deforming of the glass sheets themselves, the deformation being in the nature of diagonal streaks in the glass.

Broadly stated, the present invention is intended to eliminate or prevent improper circulation of air about the sheet during its formative period, with consequent impairment of quality of the glass sheets formed.

The many other and important objects of the invention will become clearly apparent hereinafter.

In the drawings wherein like numerals are employed to designate like parts throughout the same, Fig. 1 is a diagrammatic plan view of a double tank furnace showing a portion of a device constructed in accordance with my invention for use in connection therewith, Fig. 2 is a vertical transverse section taken on line 2—2 in Fig. 1, Fig. 3 is a fragmentary perspective detail of a portion of the apparatus, Fig. 4 is a vertical longitudinal section of a part of the apparatus in operative association with the glass forming mechanism, Fig. 5 is a fragmentary sectional detail of a part of the system which may be used, and Fig. 6 is a section taken on line 6—6 in Fig. 5.

Referring to the drawings, the numeral 10 designates the outlet end of a continuous melting tank. The invention is in no way dependent upon any particular type of furnace construction or mode of operation thereof. It may be pointed out, however, that ordinarily the regenerative type of furnace is used in the melting of glass in continuous tank furnaces. The melting end, of course, is not shown in the drawings.

Extending from the end of the tank 10 are the independent refining chambers or channels 11 shown in Fig. 1.

The numerals 12 designate cooling chambers in open communication with the refining chambers. At the top of Fig. 1, the cover-arch is broken away in part to show the molten glass 13 in the refining and cooling chambers.

A working receptacle is connected to each of the cooling chambers. As shown in Figs. 1 and 2, there are two working machines, namely, machines A and B. It will, of course, be understood that all of the batch materials are introduced into the receiving end of the melting tank 10 and there subjected to sufficient heat to reduce them to molten glass. There is considerable economy effected in the melting of glass for two working machines in a single tank. Experience has shown that while it is very desirable to melt the glass for two machines in one tank, it is likewise desirable and, practically speaking, essential to separately refine and cool the glass streams being supplied to the forming machines.

As has previously been stated, the present invention is not restricted to the specific type of sheet glass machine illustrated, but is applicable for use with all types of machines where the glass in the working receptacle and/or the glass sheet itself is exposed or partially exposed to the surrounding atmosphere.

The particular machine illustrated is of the Colburn type and as is shown in Figs. 1, 2 and 4, the molten glass 14 is contained in the working receptacle 15, and the sheet 16 is drawn transversely from the working pot. The sheet is drawn vertically, being held to width by edge engaging devices 17 such as, for example, small rotatable knurled rolls engaging the sheet near its edges only. A roll 18 is provided and over which the sheet may be deflected from the vertical to the horizontal. As shown, the sheet is carried horizontally over the rolls 19 and then into annealing leers C and D, shown in Fig. 1.

It will be noted that shields 20, ordinarily called lip-tiles, are arranged one on each side of the glass sheet to protect the sheet, while in its vertical run, from the heat and gases issuing from the furnace and the pot chamber 21. In Fig. 2, the pot chambers and pot are illustrated diagrammatically, the pot or drawing receptacle being nested within the pot chamber 21, it being customary to heat the pot by directing gas flames within the pot chamber.

All of the apparatus so far described in detail has been used in one form or another for some years and does not constitute a part of the present invention. In addition to those parts illustrated, it will be understood that water coolers or shields are arranged transversely of the sheet substantially at its base, and that also numerous portable burners are used to direct flames upon the sheet both during its vertical run and also during the deflection thereof. The operator of the machine is required to inspect the sheet from both sides of the machine and to from time to time make adjustments as required to maintain a satisfactory sheet formation.

The thickness of sheet produced is dependent chiefly upon the viscosity of the glass drawn into the sheet and the speed at which the sheet is drawn from the working receptacle. As a matter of fact, the particular type of machine shown in the drawings is a surface draw type in that the sheet is drawn from the surface of the molten mass in the pot.

One of the troubles encountered with the operation of the machine illustrated and similar types is that of dirt. Obviously, in any factory, there is a certain amount of dirt or foreign matter in and around the machines. The quality of the glass sheet formed can be spoiled by the settling of dirt upon the glass in the working receptacle or by being deposited upon the sheet while still in a plastic state.

It will be understood that the glass sheet 16 is more or less plastic until after it has passed over the roll 18, and dirt or other foreign matter settling upon the glass will in all probability become a permanent part of the sheet. Furthermore, great care is exercised in providing a highly polished surface to the roll 18 so that the surface of the plastic sheet coming in contact therewith will not be adversely affected. Oftentimes, foreign matter, moving with the sheet or deposited directly upon the roll, will cause scratching of the roll, with consequent injury to the surface of the glass sheet.

After considerable observation, it has been found that the space, designated generally by the letter E, located between the adjacent refining chambers and cooling chambers, creates what is, in effect, a stack. This results in a flow of air from the outside of the two machines across the glass in the working receptacle and out through the space E and over the top of the tank 10. The arrows in full lines in Figs. 1 and 2 indicate this passage of air. This flow of air from the outside of the two machines inwardly thereof and out through the space E is practically constant and results, so I have found, in extremely undesirable conditions.

The flow of air or other gases in this direction results in the passing of dirt and other foreign matter across the surface of the molten glass being drawn into the sheet as well as across the surface of the sheet itself. In addition to the dirt settling upon the glass and upon the bending roll, the movement of air tends to promote the formation of sheen in the sheet and also deforms the glass sheets by the formation of diagonal streaks therein.

In addition to the movement of air in this direction through the working receptacle and consequent injury to the sheets, there is the further consideration that the temperature of the space between the refining chambers and cooling chambers and working receptacles is considerably greater than it is on the outside of the two machines. This means that it becomes an extremely undesirable place for the operator, making it almost impossible for an operator to stay between the two machines for any extended time.

To satisfactorily operate the machines, the operators must of necessity, at frequent intervals, examine the sheet from both sides, making necessary adjustments and, due to the excessive temperature between the machines, there is the tendency for the operators to more or less slight the attention that should be given to the machines on the inside.

With the construction illustrated in the drawings, it is possible to prevent the flow of air and other gases across the machines in the general path indicated by the arrows. Furthermore, it is possible to prevent any substantial movement of air in either direction transversely across the glass and to also control the temperature between the adjacent machines, whereby to materially improve upon the sheet forming conditions and working conditions for the operators.

As the invention is of course not necessarily restricted to any specific construction, the arrangement shown in the drawings will, of course, be considered as only one form of device with which the present invention can be carried out.

Referring particularly to Figs. 1 and 2, it will be noted that a housing 22 is placed between the two machines. The factory floor is shown at 23, with plates 24, which may be removable, closing the gap between the factory floor and the side walls of the pot chamber 21. The working receptacles are not shut off from the interior of the housing, and in fact it is important that they are not.

Preferably, the compartment 22 is provided with an adjustable partition comprising the slidable vertical doors 25 which can be run out through the ends of the compartment when desired to convert the said compartment into a single space. Swinging doors 26 afford an entrance for the operators into the compartment and preferably two of such doors are used as is shown in Fig. 1.

The compartment is provided so that clean air of a predetermined temperature can be introduced thereinto and preferably at a pressure sufficient to offset the natural tendency heretofore encountered for the air to flow in from the outside and across the pots as above explained. To accomplish this, one or more conduits 27 are associated with the compartment and through which preferably washed air of a predetermined temperature is passed.

In Figs. 5 and 6, one form of washing and temperature control means is illustrated diagrammatically. In Fig. 5, water sprays 28 are used as will be readily understood. The air passes through the water sprays and is then passed through the radiator constructions 29. Fans or blowers 30 are employed to control the passage of air through the conduit 27 and into the compartment 22. The radiators 29 are connected to a suitable heat exchanger system so that either cool or warm temperature controlling fluids may be passed through the radiator whereby to determine the temperature of the washed air passing through the conduits and into the compartment.

Automatically controlled louvers 31 are preferably provided and, as shown, the independent sections or louvers 31 may be pivotally mounted as at 32, having associated therewith the arms 33 on which adjustable counter-balances 34 can be placed.

The fans or blowers 30 can be utilized to feed the air under pressure to the compartment. The pressure of air within the compartment is preferably such as to just offset the tendency of air to move from the outside of the machines in the manner as above explained. However, to take care of varying conditions, the pressure within the compartment may ordinarily be maintained in such a manner as to cause a slight movement of air from within the compartment outwardly of the machines, thus insuring against the reverse flow of air.

Whereas in the past, the air moving across the pot contains a certain amount of dirt which may settle upon the molten glass and the sheet itself, the movement of the air from the compartment outwardly of the machines will not prove detrimental because it is clean, and therefore no dirt will be deposited upon the sheet. Furthermore, by so controlling the movement of air, there will be no turbulence in and around the working receptacle with the result that the objectionable diagonal streaks heretofore formed in the sheet by uncontrollable air blasts will not appear.

The counter-balanced louvers are preferably employed to prevent excessive pressures from being built up within the compartment 22. The partition doors 25 may be used to prevent a cross current between machines, although in some cases it may be found that such doors are not required.

By placing such an arrangement between machines, the problem of drawing or otherwise forming high quality glass is less difficult. The temperature conditions of the molten glass in the draw-pot are more constant and uniform from side to side of the pot. The quality of the sheet in itself is greatly improved for the reasons already pointed out.

Whereas in the past, the temperature variation from the outside to the inside of the machine is considerable, by proper temperature and pressure regulation, conditions can be more nearly balanced, resulting in improvement to the sheet and working conditions for the operator.

While the device described is particularly well adapted for the double tank furnaces, the same or similar construction can be employed where working machines drawing molten glass from their own individual melting tanks are placed relatively close together.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In combination with sheet glass forming apparatus, including a pair of forming machines spaced sufficiently close that there is a natural movement of air transversely of said machines and the glass sheets being formed thereby toward the space between the machines, of means disposed between the said machines for reversing the natural movement of air transversely of the machines and glass sheets.

2. In combination with sheet glass forming apparatus, including a pair of forming machines spaced sufficiently close that there is a natural movement of air transversely of said machines and the glass sheets being formed thereby toward the space between the machines, of means disposed between said machines for creating a flow of cleaned air transversely of the machines and of sufficient pressure to prevent the aforementioned natural movement of air.

3. In combination with sheet glass forming apparatus, including a pair of forming machines spaced sufficiently close that there is a natural movement of air transversely of said machines and the glass sheets being formed thereby toward the space between the machines, of means disposed between said machines for creating a flow of cleaned air transversely of the machines and of sufficient pressure to prevent the aforementioned natural movement of air, and means for controlling the temperature of said air.

4. In combination with sheet glass forming apparatus, including a pair of forming machines spaced sufficiently close that there is a natural movement of air transversely of said machines and the glass sheets being formed thereby toward the space between the machines, a compartment arranged between said machines, means for supplying cleaned air to said compartment, and means for building up sufficient pressure of the cleaned air in the compartment to offset the natural movement of air transversely of the machines and glass sheets being formed thereby.

5. In combination with sheet glass forming apparatus, including a pair of forming machines spaced sufficiently close that there is a natural movement of air transversely of said machines and the glass sheets being formed thereby toward the space between the machines, a compartment arranged between said machines, means for supplying cleaned air to said compartment, means for building up sufficient pressure of the cleaned air in the compartment to offset the natural movement of air transversely of the machines and glass sheets being formed thereby, and means for preventing the building up of excessive pressure within said compartment.

6. In combination with sheet glass forming apparatus, including a pair of forming machines spaced sufficiently close that there is a natural movement of air transversely of said machines and the glass sheets being formed thereby toward the space between the machines, a compartment arranged between said machines, means for supplying cleaned air to said compartment, means for building up sufficient pressure of the cleaned air in the compartment to offset the natural movement of air transversely of the machines and glass sheets being formed thereby, means for preventing the building up of excessive pressure within said compartment, and means for controlling the temperature of the air.

7. In combination with sheet glass forming apparatus, including a pair of forming machines spaced sufficiently close that there is a natural movement of air transversely of said machines and the glass sheets being formed thereby toward the space between the machines, a compartment arranged between said machines, means for supplying cleaned air to said compartment, means for building up sufficient pressure of the cleaned air in the compartment to offset the natural movement of air transversely of the machines and glass sheets being formed thereby, and adjustable means for automatically controlling the pressure of air maintained within said compartment.

8. In combination with sheet glass forming apparatus, including a pair of forming machines spaced sufficiently close that there is a natural movement of air transversely of said machines and the glass sheets being formed thereby toward the space between the machines, a closed structure arranged between the machines and in open communication with each machine, means for dividing the same into two compartments, one for each machine, and means for supplying cleaned air to said compartments for preventing the aforementioned natural movement of air transversely of the machines and sheets formed thereby.

9. In combination with sheet glass forming apparatus, including a pair of forming machines spaced sufficiently close that there is a natural movement of air transversely of said machines and the glass sheets being formed thereby toward the space between the machines, a closed structure arranged between said machines and in open communication therewith, means for supplying air under pressure to the interior of such structure, and counterbalanced louvers associated with the structure for automatically maintaining a predetermined pressure of air within the structure.

10. In combination with sheet glass forming apparatus, including a pair of forming machines spaced sufficiently close that there is a natural movement of air transversely of said machines and the glass sheets being formed thereby toward the space between the machines, a closed structure arranged between said machines and in open communication therewith, means for supplying air under pressure to the interior of such structure, counter-balanced louvers associated with the structure for automatically maintaining a predetermined pressure of air within the structure, and means for controlling the temperature of said air.

11. In combination with sheet glass forming apparatus, including a pair of forming machines spaced sufficiently close that there is a natural movement of air transversely of said machines and the glass sheets being formed thereby toward the space between the machines, a closed structure arranged between said machines, and in open communication therewith, means for supplying air under pressure to the interior of such structure, counter-balanced louvers associated with the structure for automatically maintaining a predetermined pressure of air within the structure, means for controlling the temperature of said air, and a movable partition for dividing the structure into two separate compartments when desired, one compartment for each machine.

12. In combination with sheet glass forming apparatus, including a pair of forming machines spaced sufficiently close that there is a natural movement of air transversely of said machines and the glass sheets being formed thereby toward the space between the machines, a closed structure arranged betweeen the two machines and in open communication therewith, means for continuously supplying a flow of cleaned air having a predetermined temperature to the interior of the structure, and means for controlling the pressure of such air within the structure.

13. In combination with sheet glass forming apparatus, including a pair of forming machines spaced sufficiently close that there is a natural movement of air transversely of said machines and the glass sheets being formed thereby toward the space between the machines, a closed structure arranged between said machines and in open communication therewith, means for supplying air under pressure to the interior of such structure, means for controlling the temperature of said air, a movable partition for dividing the structure into two separate compartments when desired, one compartment for each machine, and automatic ventilating means for maintaining the air within the closed structure at the desired pressure.

DAVID H. GOODWILLIE.